SAM T. KIGUCHI
INVENTOR.

BY

ATTORNEYS.

3,242,969
POLYMER DESOLVENTIZER OF THE ROTARY
WIPED FALLING FILM TYPE
Sam T. Kiguchi, Pasadena, Calif., assignor to C. F. Braun & Co., Alhambra, Calif., a corporation of California
Filed Jan. 31, 1963, Ser. No. 255,308
7 Claims. (Cl. 159—6)

This invention relates to the recovery of solid polymers from solution and more particularly relates to a method and apparatus for directly removing solvent from a polymer solution.

In many methods of preparing solid polymers the product is obtained as a solution of polymer in a solvent or diluent material. Since most major uses of polymers require a dry product, it is necessary that the polymer be separated from the solution. One method proposed for this separation involves heating the solution to vaporize the solvent. Vaporizing the solvent by the conventional heat exchange equipment is, however, difficult because of the high viscosity of many polymers. As a result, other solvent removal methods have been used, such as the coagulation of the polymer with noncompatible liquids and steam-stripping the solvent from the resulting coagulant suspension. While such a method is generally satisfactory, it adds complexity and expense to the system.

According to the present invention, it has been found that a method and apparatus may be provided for direct solvent removal from even the most viscous polymers. This direct solvent removal is made possible by use of a novel thin-film evaporator that provides means for forming a thin film of polymer, means for applying heat to the film to cause the solvents to be vaporized, means for working film to impart heat to polymer by mechanical energy, and means for aiding gravity in pumping the polymer out of the evaporator as it becomes more viscous, thereby preventing the buildup of polymer on the evaporator wall which would cause excessive loads on the rotor.

It is therefore an object of the present invention to provide a method and apparatus for recovering polymers from solution.

It is another object of the present invention to provide a thin-film evaporator suitable for use with highly viscous materials.

It is another object of the present invention to provide a thin-film evaporator having a structure for preventing the buildup of viscous material on the evaporator wall.

It is a further object of the present invention to provide a polymer desolventizer having vanes to create a thin film of material, turbulence in the material to impart heat to the material and a screw blade for pumping the material out of the desolventizer, the vanes and screw blade being coextensive over a portion of their lengths.

These and other objects and advantages of the present invention will become more apparent upon reference to the accompanying description and drawings in which.

Figure 1:
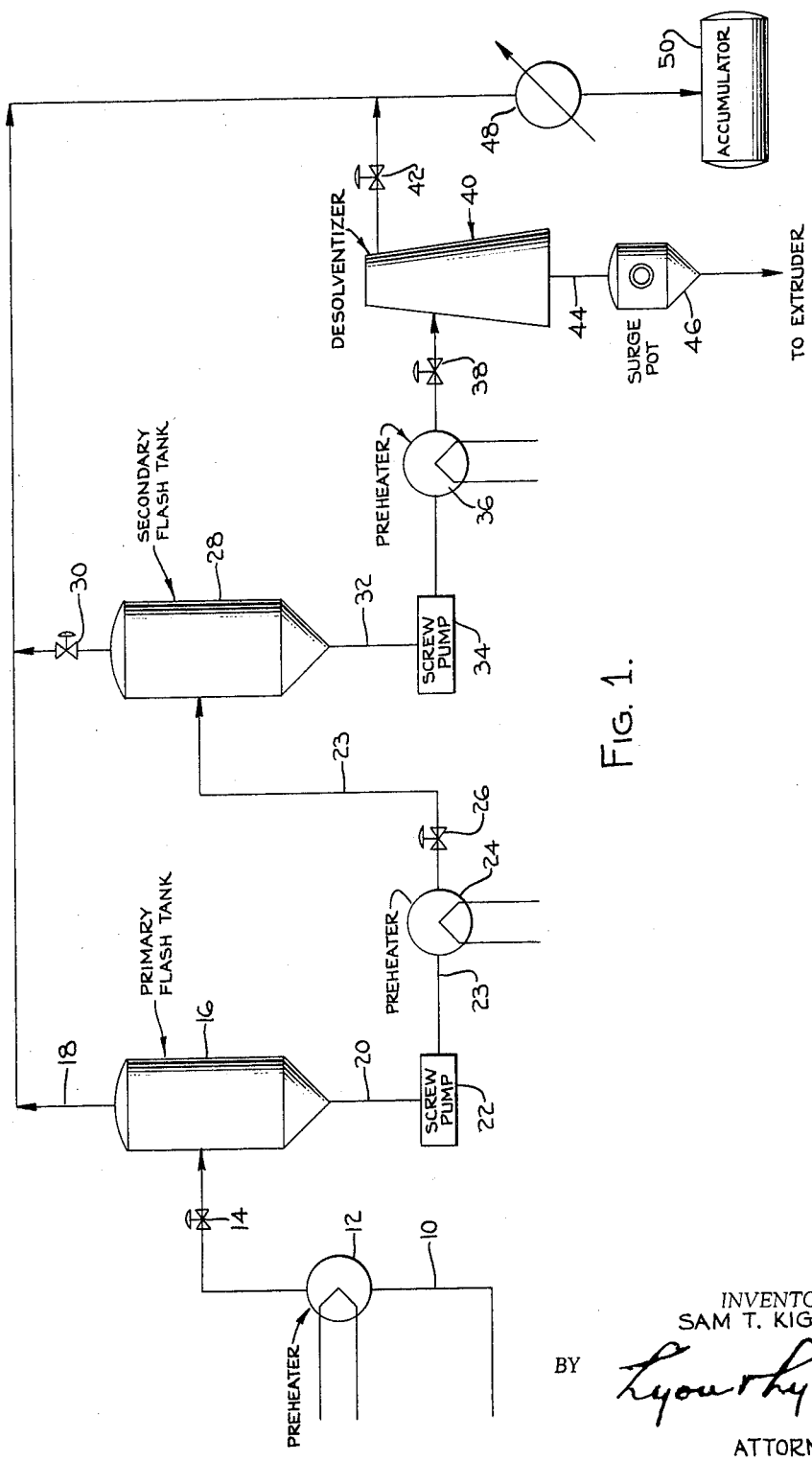
FIGURE 1 is a block flow diagram of one polymer recovery system incorporating the polymer desolventizer of the present invention.

Referring now to FIGURE 1, a system for recovering polymer from solution is shown. The polymer solution enters the system through a line 10 and is passed through a preheater 12 and a pressure regulator 14 into a primary flash tank 16. The primary flash tank 16 is maintained at a pressure substantially less than the pressure in the line 10 so that a portion of the solvent vaporizes and passes out of the flash tank through the line 18. The remaining material in the flash tank 16 is passed through the line 20 to a screw pump 22 which forces it through line 23 to a second preheater 24 and pressure regulator 26 and thence to a secondary flash tank 28.

The secondary flash tank 28 is maintained at a pressure below that in the line 23 so that a further amount of the solvent will vaporize and pass to the line 18 through a pressure regulator 30. The remaining material in the secondary flash tank 28 passes through the line 32 to the screw pump 34 which forces it through a third preheater 36 and pressure regulator 38 into a desolventizer 40, the details of which will be fully described in connection with FIGURES 2, 3 and 4. The desolventizer 40 removes the remainder of the solvent from the polymer and passes it in vaporized form through a pressure regulator 42 to the line 18. The solid polymer is passed through the line 44 to a surge pot 46 and thence to an extruder of any conventional design. The vaporized solvent is passed to a solvent condenser 48 and thence to an accumulator 50.

Figure 2:
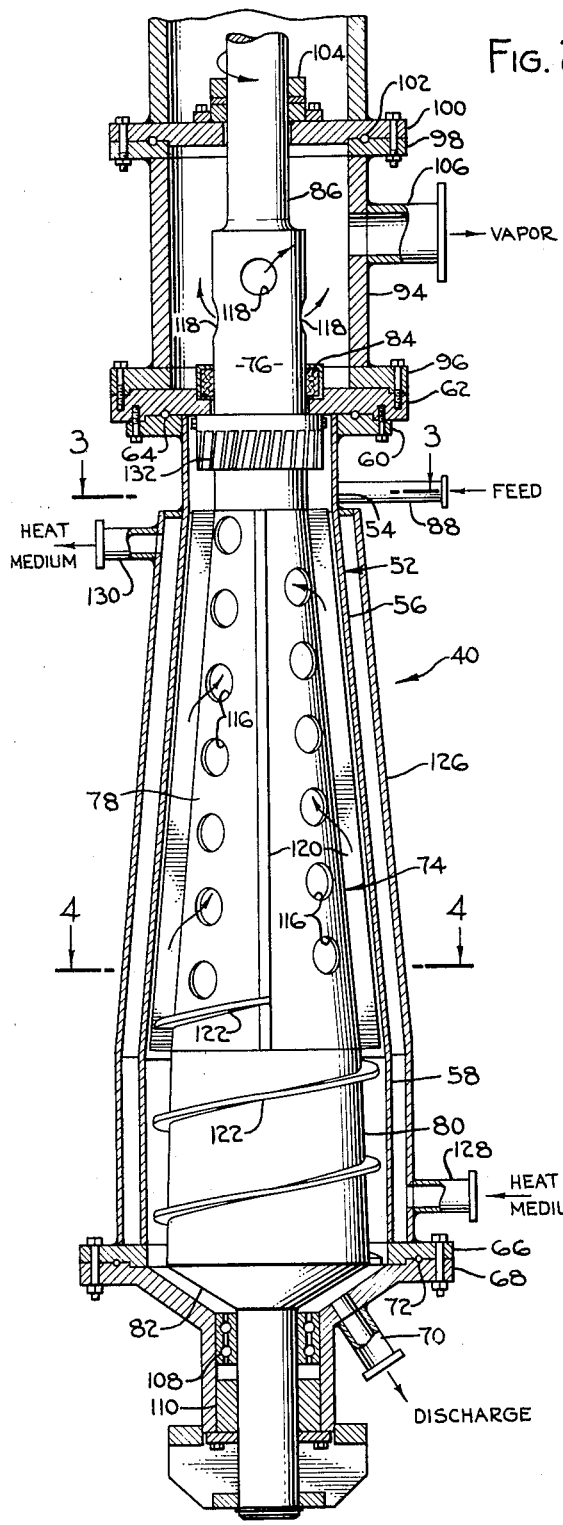
FIGURE 2 is a side elevation, partly in section, of the polymer desolventizer of the present invention.
Figure 3:
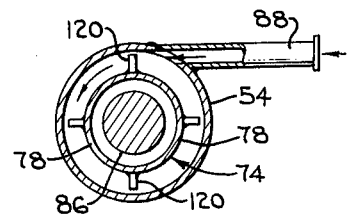
FIGURE 3 is a sectional view taken substantially along lines 3—3 of FIGURE 2.
Figure 4:
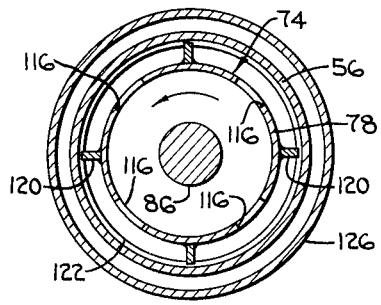
FIGURE 4 is a sectional view taken substantially along lines 4—4 of FIGURE 2.

Referring now to FIGURES 2, 3 and 4, the polymer desolventizer 40 is shown in more complete detail. A metallic wall, generally indicated at 52, defines a chamber and is composed of an upper cylindrical portion 54, a central portion 56 which diverges outwardly towards the bottom, and a lower cylindrical portion 58. The upper portion 54 of the wall is provided with a collar plate 60 and a closure plate 62 which are bolted together in any suitable fashion and provided with a seal 64 to prevent passage of vapor or gas. The lower portion 58 of the wall 52 is provided with a flange 66 to which is bolted a funnel-shaped member 68 having a discharge passage 70 located adjacent the bottom of its conical portion. The flange 66 and member 68 are provided with a seal 72 to prevent the passage of vapor or gas between them.

A rotor, generally indicated at 74, is partially positioned in the chamber defined by the wall 52 and comprises an upper cylindrical portion 76, a central portion 78 that diverges outwardly at approximately the same angle as the wall 56, a lower portion 80 which preferably diverges outward at a lesser angle than the portion 78, and a conical section 82 having approximately the same slope as the conical portion of the member 68. The rotor is attached at its upper end to a drive shaft 86 which, as shown, extends completely through the hollow interior of the rotor 74, but which, if desired, may be made in sections suitably attached to either end of the rotor. A tangential inlet feed conduit or nozzle 88 is provided in the wall 54 at a point just above the diverging section of the rotor so that the polymer solution from the regulator 38 is uniformly distributed onto the chamber walls by the action of the rotor.

As may be seen from the drawing, the upper cylindrical portion 76 of the rotor 52 extends into a second chamber defined by a metallic tubular member 94 which has a flange 96 bolted to the closure plate 62. The tube 94 is also provided at its upper end with a flange 98 and a closure plate 100 which are bolted together and provided with a suitable seal 102. The upper end of the drive shaft 86 extends through an opening in the closure plate 100 and is supported for rotation therein by a suitable bearing 104. The chamber defined by the tube 94 is provided with a discharge passage 106 extending through the wall of the tube 94.

The lower end of the drive shaft 86 is supported for rotation in the cylindrical portion of the funnel-shaped member 68 by means of a suitable bearing 108. A seal 110 is also provided around the lower portion of the drive shaft 86.

As may be seen from FIGURES 3 and 4, the interior of the rotor 74 is hollow and serves to communicate the chamber defined by the wall 52 with the chamber defined by the tube 94. For this purpose, the diverging portion of the rotor is provided with a plurality of openings 116 and the cylindrical portion of the rotor above the closure plate 62 is provided with a plurality of similar openings 118. The diverging portion 78 of the rotor 74 is provided with a plurality of vanes 120 which extend radially outward into close proximity with the wall 56.

As shown, these vanes are four in number and run parallel to the vertical axis of the rotor 74. However, the number of these vanes may be changed if desired and they may be attached in a spiral manner so that they exert a downward force on the polymer solution to move it to the bottom edge of the wall while maintaining a thin, frequently regenerated film on the wall. This would be especially useful if a cylindrical heat exchange chamber was used rather than the diverging one illustrated. The lower portion 80 of the rotor 74 is provided with a continuous screw blade 122 which also extends over the lower part of the portion 78 so as to overlap the rotor blades 120, an overlap of at least 10 percent of the vanes having been found necessary to achieve maximum performance. The outer diameter of all of the screw blades 122 is constant so that the depth of flight decreases toward the bottom.

A heating jacket 126 is provided around the portions 56 and 58 of the wall 52 and has an inlet 128 and an outlet 130. By passing a suitable heating medium such as a heating liquid or a condensing vapor, such as steam, into the jacket 126, the wall 52 can be maintained at any desired temperature. In the case of a condensing vapor, the functions of the inlet 128 and outlet 130 would be reversed. Of course, other heating means such as an electrical heater may be used in place of the heating jacket illustrated. If desired, a plurality of canted vanes 132 may be mounted on the cylindrical portion 76 of the rotor 74 in an area above the feed nozzle 88. These vanes serve to remove liquid entrained in vapor by impingement and centrifugal action. The use of canted vanes provides downward movement to the liquid as it is thrown onto the wall by centrifugal action and thus it is incorporated in the solution forming a thin film on the wall of the chamber.

In the operation of this apparatus, the polymer solution is fed to the interior of the wall 52 by the tangential feed nozzle 88. The drive shaft 86 and rotor 74 are rotated at a speed sufficient to obtain a minimum tip speed of 20–30 ft./sec. The polymer solution is thrown against the diverging wall 56 by centrifugal action and forms a thin film which moves downward due to the downward velocity component exerted by the radial push along a diverging wall or by the curved spiral blades attached to the rotor. The high speed of the rotor creates high turbulence in the liquid film descending the wall and causes the polymer solution to absorb mechanical heat from the rotor as well as heat from the heating medium in the jacket 126.

The excessive turbulence also creates frequent fresh surfaces so that vaporized solvent can escape from the viscous polymer solution and pass through the holes 116 to the interior of the rotor, whence it rises to the upper chamber defined by the tube 94 and thence through the outlet 106 to the line 18 and solvent condenser 48. The violent turbulence also exposes frequent fresh surfaces to the jacketed walls of the chamber resulting in a better heat transfer between these walls and the film of polymer solution.

As the film of polymer solution descends the wall 56, it becomes progressively more viscous because of the liberation of the vaporized solvent. With highly viscous material, this desolventizing causes a thick film to build up on the wall 56 which if not removed would overload the rotor. The rotor is designed to move the solution under positive force at all times. This is important especially in moving the polymer from the heat transfer walls to the chamber 58. For this purpose, the screw blade 122 operates as a screw pump and forces the viscous material off the wall 56 and into the portion of the chamber defined by the wall 58 and thence through the discharge outlet 70 to the line 44 and surge pot 46. The overlap of the screw blade 122 over the vanes 120 thus facilitates the centrifugal action of the vanes as it prevents them from becoming overloaded. As previously pointed out, it has been found that an overlap of at least 10 percent is necessary for maximum effectiveness of the screw blade. It should be noted that the screw 122 acts as a screw pump and not merely as pusher blades and thus exerts a continuous downward force on the viscous material.

In one application of the system shown in FIGURE 1, 160,360 pounds per hour of a 4 percent polymer solution was supplied to the line 10. The solution was heated to 420° F. by the preheater 12 and maintained at a pressure of 250 p.s.i.a. by the regulator 14. The temperature in the primary flash tank was maintained at 310° F. and the pressure at 90 p.s.i.a. with the result that 85,700 pounds per hour of solvent in vapor state was passed through the line 18 and the material passing through the line 20 now contained 8.6 percent polymer.

This solution was heated to 450° F. in the preheater 24 and maintained at a pressure of 310 p.s.i.a. by the regulator 26. The secondary flash tank 28 was maintained at 375° F. and 180 p.s.i.a. with the result that 32,000 pounds per hour of solvent was vaporized and passed to the line 18 and the polymer content of the solution passing through the line 32 increased to 15 percent. This solution was heated to 450° F. in the preheater 36 and maintained at a pressure of 250 p.s.i.a. by the regulator 38. The temperature in the desolventizer 40 was maintained at 400° F. and the pressure at 205 p.s.i.a. while the rotor was rotated at a speed such that the velocity of the polymer solution leaving the rotor vanes was approximately 40 feet per second. The desolventizer vaporized and removed 36,160 pounds per hour of solvent from the solution with the result that the material leaving the desolventizer by the line 44 was 98 percent polymer.

From the foregoing description, it can be seen that an improved method for removing solvents from a solution containing a polymer and the solvents has been provided, as well as apparatus suitable for carrying out the method. The method and apparatus permit the direct separation of the solvent and polymer without the necessity of the intermediate steps which added to the complexity and expense of prior systems. This direct separation is made possible by simultaneously creating a very turbulent thin film of heated polymer solution and aiding the film movement as it becomes more viscous as solvent is removed. The apparatus produces a liquid polymer that congeals to a solid upon cooling, and eliminates any dead spots where polymer can stagnate.

The invention may be embodied in other specific forms not departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. Apparatus for separating a liquid from a viscous material, comprising in combination:
   a wall defining a vertical tubular chamber of circular section;
   a rotor mounted for rotation in said chamber;
   a plurality of vanes mounted on said rotor and extending outwardly therefrom into close proximity with said wall;

means at the upper end of said chamber for introducing said material;
means for applying heat to said wall;
an outlet for said viscous material at the lower end of said chamber; and
screw means mounted on the lower end of said rotor, said screw means overlapping said vanes and extending into close proximity with said wall in the area of overlap with said vanes.

2. Apparatus for separating a liquid from a viscous material, comprising in combination:
a wall defining a vertical tubular chamber of circular section;
a rotor mounted for rotation in said chamber;
a plurality of vanes mounted on said rotor and extending outwardly therefrom into close proximity with said wall;
means at the upper end of said chamber for introducing said material;
means for rotating said rotor whereby a thin film of said material is formed on said wall;
means for applying heat to said wall to vaporize liquid present in said material;
an outlet for said viscous material at the lower end of said chamber; and
screw means mounted on the lower end of said rotor, said screw means overlapping a portion of said vanes and extending into close proximity with said wall in the area of overlap with said vanes thereby preventing the formation of a thick film of said viscous material on said wall.

3. Apparatus for removing a liquid from a solution containing the liquid and a viscous material, comprising in combination:
a wall defining a vertical tubular chamber of circular section;
a rotor mounted for rotation in said chamber, said rotor being at least partially hollow and having a plurality of holes therein;
a plurality of vanes mounted on said rotor and extending outwardly therefrom into close proximity with said wall;
means at the upper end of said chamber for introducing said solution into said chamber;
means for rotating said rotor whereby a thin film of said solution is formed on said wall;
means for applying heat to said wall to vaporize liquid present in said solution so that the vapor may pass into the interior of said rotor;
an outlet for said viscous material at the lower end of said chamber; and
a continuous screw blade mounted on the lower end of said rotor, said screw blade overlapping a portion of said vanes and extending into close proximity with said wall in the area of overlap with said vanes, thereby preventing the formation of a thick film of said viscous material on said wall.

4. Apparatus for removing a liquid from a solution containing the liquid and a viscous material, comprising in combination:
a wall defining a vertical tubular chamber of circular section;
a rotor mounted for rotation in said chamber, said rotor having a perforated outer surface and being at least partially hollow, the hollow portion of said rotor being in communication with the exterior of said chamber;
a plurality of vanes mounted on the outer surface of said rotor and extending outwardly therefrom into close proximity with said wall;
means at the upper end of said chamber for introducing said solution into said chamber;
means for rotating said rotor whereby a thin film of said solution is formed on said wall;
means for applying heat to said wall to vaporize liquid present in said solution, said vapor passing through said perforations to said hollow portion of said rotor and thence out of said chamber;
an outlet for said viscous material at the lower end of said chamber; and
a continuous screw blade mounted on the lower end of the surface of said rotor, said screw blade overlapping a portion of said vanes and extending into close proximity with said wall in the area of overlap with said vanes and acting to pump said viscous material through said outlet whereby the formation of a thick film of said viscous material on said wall is prevented.

5. The apparatus of claim 4 wherein said screw blade overlaps at least ten percent of the length of said vanes.

6. Apparatus for removing solvents from a solution containing the solvents and a viscous polymer, comprising in combination:
a wall defining a vertical tubular chamber, said wall including an upper portion diverging outwardly in the downward direction and a lower, cylindrical portion contiguous with said upper portion;
a rotor mounted for rotation in said chamber, said rotor having a perforated outer surface and being at least partially hollow, the hollow portion of said rotor being in communication with the exterior of said chamber;
a plurality of vanes mounted on the outer surface of said rotor and extending outwardly therefrom into close proximity with the upper portion of said wall;
means at the upper end of said chamber for introducing said solution into said chamber;
means for rotating said rotor whereby a turbulent thin film of said solution is formed on said wall;
means for applying heat to said wall to vaporize said solvents in said solution, said vapor passing through said perforations into said hollow portion of said rotor and hence out of said chamber;
an outlet for said viscous polymer at the lower end of said chamber; and
a continuous screw blade mounted on the lower end of the surface of the rotor and extending outwardly therefrom into close proximity with the lower portion of said wall, said screw blade overlapping a portion of said vanes and acting to pump said viscous polymer through said outlet and thereby prevent the formation of a thick film of said viscous polymer on said wall.

7. The apparatus of claim 6 wherein said screw blade overlaps at least ten percent of the length of said vanes.

References Cited by the Examiner

UNITED STATES PATENTS

| | | | |
|---|---|---|---|
| 1,466,579 | 8/1923 | Collver | 159—6 |
| 2,011,055 | 8/1935 | Klugh | 159—2 |
| 2,546,380 | 3/1951 | Zahm | 159—6 |
| 2,774,415 | 12/1956 | Belcher | 159—6 |
| 2,868,279 | 1/1959 | Bechtler | 159—5 |
| 2,927,634 | 3/1960 | Gudheim | 159—6 |
| 3,067,812 | 12/1962 | Latinen et al. | 159—6 |
| 3,107,194 | 10/1963 | Bechtler | 159—6 |
| 3,137,608 | 6/1964 | Rogers | 159—6 |

NORMAN YUDKOFF, *Primary Examiner.*

J. SOFER, *Assistant Examiner.*